United States Patent
Emmons et al.

(10) Patent No.: US 6,757,616 B1
(45) Date of Patent: Jun. 29, 2004

(54) MODEL-FREE REFRACTION STATICS SOLUTION

(76) Inventors: Charles Wayne Emmons, 17114 Hall Shepard Rd., Houston, TX (US) 77049; Charles Ivan Burch, 2817 Fieldcrest, Ponca City, OK (US) 74604; Karen Pauline Goodger, 21315 River Knoll La., Katy, TX (US) 77449

( * ) Notice: Subject to any disclaimer, the term of this patent is extended or adjusted under 35 U.S.C. 154(b) by 0 days.

(21) Appl. No.: 10/357,604

(22) Filed: Feb. 4, 2003

(51) Int. Cl.$^7$ .................................................. G01V 1/28
(52) U.S. Cl. ...................................................... 702/18
(58) Field of Search ............................. 702/14, 17, 18; 367/54, 73

(56) References Cited

U.S. PATENT DOCUMENTS

| | | | |
|---|---|---|---|
| 6,278,950 B1 * | 8/2001 | Kim et al. | 702/17 |
| 6,424,920 B1 | 7/2002 | Osypov | 702/18 |
| 6,546,339 B2 * | 4/2003 | Bevc et al. | 702/18 |

OTHER PUBLICATIONS

Derecke Palmer; *An introduction to the generated reciprocal method of seismic refraction interpretation*, Geophysics, vol. 46, No. 11 (Nov. 1981); pp. 1508–1518, 21 Figs., 1 Table.

M. Turhan Taner et al.; *A unified method for 2–D and 3–D refraction statics*, Geophysics, vol. 63, No. 1 (Jan–Feb. 1998), pp. 260–274, 12 Figs.

* cited by examiner

*Primary Examiner*—Donald McElheny, Jr.
(74) *Attorney, Agent, or Firm*—Madan, Mossman & Sriram, P.C.

(57) ABSTRACT

The present invention provides a method of determining source and receiver static corrections for seismic data that does not depend on user supplied velocity parameters or input models. The method comprises decomposing first break seismic data arrivals into source id terms, receiver id terms, offset terms and average datum correction terms. The source id terms and receiver id terms and offset terms are applied to the seismic data to obtain residual first break times. Average datum correction terms are determined by forming a nonlinear equation for a least-squares fit of the residual first break times as a function of elevation difference. At least one receiver static correction term is determined from the receiver id terms and receiver average datum correction terms. At least one source static correction is determined from said source id terms and source average datum correction terms.

22 Claims, 6 Drawing Sheets

Gauss-Seidel Setup

Elevation Difference Term Calculation

MODEL-FREE REFRACTION STATICS SOLUTION

FIELD OF THE INVENTION

This invention relates to the field of geophysical prospecting and, more particularly, to a method for determining refraction static solutions to apply to seismic data.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

In the FIG. 1, a cross-sectional view of the earth that includes a weathering layer 10 beneath the earth's surface E is shown in the vicinity of a subsurface seismic survey. The weathered layer 10 is often referred to the low-velocity-layer or LVL. Seismic energy is imparted into the earth at a shotpoint S, typically at the surface or some suitable depth within the weathering layer 10. The seismic energy travels outwardly from the shotpoint S through the weathering layer 10 and therefrom through an interface I between the weathering layer 10 and deeper subsurface earth formations 16. The seismic energy travels into the earth and portions of the energy are reflected by interfaces, such as one indicated at 14. Reflected energy travels upwardly from the reflectors through the subsurface formations 16 through the weathering layer 10 to a detector or array of detectors indicated schematically at R located at or near the earth's surface E. The responses of the reflectors are then recorded and processed. It should also be understood that the present invention may be used with marine seismic survey data, as well. The purpose of reflection surveying is to identify subsurface formations or features of interest.

FIG. 1 contains a seismic datum labeled Datum. The seismic datum is an arbitrary reference surface, the reduction to which minimizes local topographic and near-surface effects. Seismic times and velocity determinations are referred to the datum plane (usually, but not necessarily, horizontal and planar) as if sources and geophones had been located on the datum plane and as if no weathered layer or low-velocity layer existed.

However, the low-velocity or weathering layer 10 is not of uniform thickness or elevation and the composition of the materials and their density within the layer varies, as does the seismic velocity within the weathering layer. The lack of uniformity in weathering layer characteristics introduces unwanted effects, anomalies and fluctuations in seismic energy traveltimes. These difference in seismic energy traveltimes can induce severe distortions in seismic images during data processing. These effects are generally referred to as statics, and it is well known in the art that static corrections may be applied to the data to correct for these effects.

FIG. 1 shows an example seismic raypath P1 through P4 traversing the weathered layer 10 and the subsurface earth formation 16. The time seismic energy takes to traverse the weathered layer may be highly variable both in traversing from the source S through the weathered layer 10 along P1 as well as along P2, P3 and returning to the detector R on the surface along P4.

Static corrections are corrections applied to seismic data to compensate for the effects of variations in elevation, near-surface low-velocity-layer weathering thickness, weathering velocity, and/or reference to a datum (See Sheriff, R. E., 2002, Encyclopedic Dictionary of Exploration Geophysics: Soc. of Expl. Geophys., 334–335). The objective is to determine the reflection arrival times that would have been observed if all seismic recording measurements had been made on a flat plane with no weathering or low-velocity material present, equivalent to the situation if the source S and receiver R were positioned at the level of the Datum of FIG. 1. After static corrections are applied, the source S would appear as source S' at the elevation of the Datum, and receiver R would appear as R' at the elevation of the seismic datum. These corrections are based on uphole data, refraction first-breaks, event smoothing, and sometimes other geophysical methods. The most common convention is that a negative static correction reduces the reflection time. Uphole-based statics involve the direct measurement of vertical traveltimes from a buried source. This is usually the best static-correction method where feasible.

Underlying the concept of conventional static corrections is the assumption that a simple time shift of an entire seismic trace will yield the seismic record that would have been observed if the geophones had been displaced vertically downward (or upward) to the reference Datum, an assumption not strictly true, especially if the surface-to-datum distance is large, and that the velocity of the weathering layer 10 does not change horizontally. Conventional static correction methods are most apt to fail where there are 1) large rapid changes in the topography or base of weathering, 2) horizontal velocity changes below the weathering, thus violating the assumption that the subdatum velocity does not vary significantly, 3) large elevation differences between the datum and the base of the weathering, or 4) inadequate controls on long-wavelength statics. Large sea-floor relief is apt to be associated with horizontal velocity changes that cannot be compensated with static corrections.

In seismic data processing, it is desirable to correct for these statics and eliminate as much as possible the effects of variations in the weathering layer 10 and other statics on the seismic data. It is highly desirable to have the seismic data be in a form as if it had resulted from a survey conducted on a substantially flat plane or datum at a constant elevation in the earth. To compensate for statics, it is necessary to determine the amount of time delay introduced by travel of seismic energy above or below the datum level and then remove the effects of this time delay from the seismic data. In effect, static correction compensates for elevation differences of the source S and detector R from the datum level, for changes in thickness in and along the weathering layer, and for variations in the density and velocity of the weathering layer 10.

If the structure and dynamics of weathering layer anomalies were known, the best way to tackle this problem would be to perform wave-equation datuming or depth migration from the surface through the known structure. However, 3-D prestack depth imaging and datuming are computationally expensive. Therefore, prior art statics applications that assume surface-consistent ray propagation through the near surface weathered layer have remained the main tool to account for near-surface anomalies.

Prior art refraction statics solution algorithms have generally employed a four step procedure. 1) 1) First arrival times of refracted arrivals are determined and properties of the weathered layer (such as weathered layer velocity) are estimated. 2) A trial model of the weathered layer is developed. This model may consist of one or more layers, or for tomographic algorithm approaches, a large number of small cells. 3) An iterative scheme is employed to adjust the model parameters so that they become more consistent, in some optimum sense, with the first arrival timing information and other user specified information. Many iterative schemes have been used to invert for model parameters, for example a generalized linear inversion (GLI) scheme or a tomographic scheme (Hampson, D. and Russell, B., 1984, First-break interpretation using generalized linear inversion, 54th Ann. Internat. Mtg: Soc. of Expl. Geophys., Session:S10.4). 4) Vertical rays are traced through the final version of the model at source and receiver locations to determine the static corrections that can be applied to the seismic data.

These traditional methods have several shortcomings. First, these methods require an accurate model of the weathered layer for good results. Frequently the weathered zones cannot be accurately modeled due to invalid initial assumptions about the zones' properties or because the model is not well constrained by the first arrival time information. Also, traditional methods require the user to make accurate estimates of certain weathered layer attributes about which little is generally known. Traditional methods do not exploit the statistical independence of the offset term from the other terms employed in the present invention. Finally, traditional methods impose certain conditions or constraints on the model of the weathered layer which may not be consistent with the first arrival time information.

Analyzing the stacking responses of reflection data works better for estimating the short-period part of a statics correction term (so called residual statics), while estimation of the long-period statics correction term using reflection data alone is very unstable and inefficient. Therefore, analysis of refraction data for statics estimation correction solutions to reveal more information about the near surface, and correspondingly about statics, is customary in conventional seismic processing.

One well known prior art method of statics correction generation is the Generalized Reciprocal Method (GRM). The generalized reciprocal method has been widely applied to 2-D data (Palmer, D., 1981, An introduction to the generalized reciprocal method of seismic refraction interpretation: Geophysics, Soc. of Expl. Geophys., 46, 1508–1518). Unfortunately, for 3-D seismic the reciprocal method is difficult to apply due to the lack of reciprocal data. Another prior art method is called the Delay-Time method. The delay-time method assumes a near-surface model of locally flat layers on the scale of offset range. First arrivals were assumed to be the onset of head waves propagating along refracting interfaces of these layers. First arrival pick times are decomposed into delay times and refracting-layer velocities. Delay times are then converted to obtain layer thickness values and velocities assuming a critical angle of incidence on the refracting layers. An example of a delay time method is U.S. Pat. No. 6,424,920 to Osypov. The method uses differential delay times. Different types of refracted waves including head waves and diving waves are inverted. First, traveltime/offset functions for station in the seismic survey are estimated from first-arrival picks. Next, the traveltime/offset functions are transformed into velocity/depth functions to make up a near-surface model. Then, long-period statics are calculated using the derived near-surface model. Finally, short-period statics are estimated by a surface-consistent decomposition of the traveltime residuals.

The delay-time method is also used in other approaches, such as Generalized Linear Inversion (GLI) and head-wave refraction tomography (Hampson, D. and Russell, B., 1984, First-break interpretation using generalized linear inversion, 54th Ann. Internat. Mtg: Soc. of Expl. Geophys., Session:S10.4). In these methods, instead of the two-step inversion via delay times, traveltimes were inverted directly for layer thicknesses and velocities. However, these methods also had to deal with the problem of velocity/depth ambiguity. To address this issue, it was common practice to fix the weathering velocity prior to depth estimation. Incorporation of reflection data for joint inversion with refraction data could at times reduce the velocity/depth ambiguities. Unfortunately, near-surface reflections were very difficult to pick in normal production data.

One of the main problems with prior art refraction static correction methods has been that in areas with complex geology and rough terrains the simple model typically employed is not sufficient to explain important data features or adequately provide for good seismic imaging. Moreover, in order to fit the observed nonlinear move-out of first arrivals the offset range had to be limited or many more layers in the model had to be added. Both approaches made inversion even more unstable, ambiguous, time consuming and not sufficiently accurate.

Prior art solutions for static correction determinations are dependent upon input velocities and/or near-surface models that may be derived or estimated from weathering layers with highly variable velocities. This situation leads to inherent uncertainty whether the velocities are adequate for good statics correction solutions. It would be advantageous to have a method and system for statics correction solutions that did not depend upon user supplied input velocity parameters or models.

SUMMARY OF THE INVENTION

The present invention provides a method of determining source and receiver static corrections for seismic data that does not depend on user supplied velocity parameters or input models. The method comprises decomposing first break seismic data arrivals into source id terms, receiver id terms, offset terms and average datum correction terms. The source id terms and receiver id terms and offset terms are applied to the seismic data to obtain residual first break times. Average datum correction terms are determined by forming a nonlinear equation for a least-squares fit of the residual first break times as a function of elevation difference. At least one receiver static correction term is determined from the receiver id terms and receiver average datum correction terms. At least one source static correction is determined from said source id terms and source average datum correction terms.

The seismic data may be all within the same shot profile. The source, receiver offset terms and elevation difference terms may be determined using Gauss-Seidel iterations and discarding outlier values greater than a predetermined threshold. The nonlinear equation may be of the form $y=Ae^{xb}$, where y is residual time, x is the elevation difference from the average elevation, A is a scalar and b is exponent of the nonlinear best fit curve associated with the difference in elevation.

BRIEF DESCRIPTION OF THE DRAWINGS

The present invention and its advantages will be better understood by referring to the following detailed description and the attached drawings in which.

Figure 1:
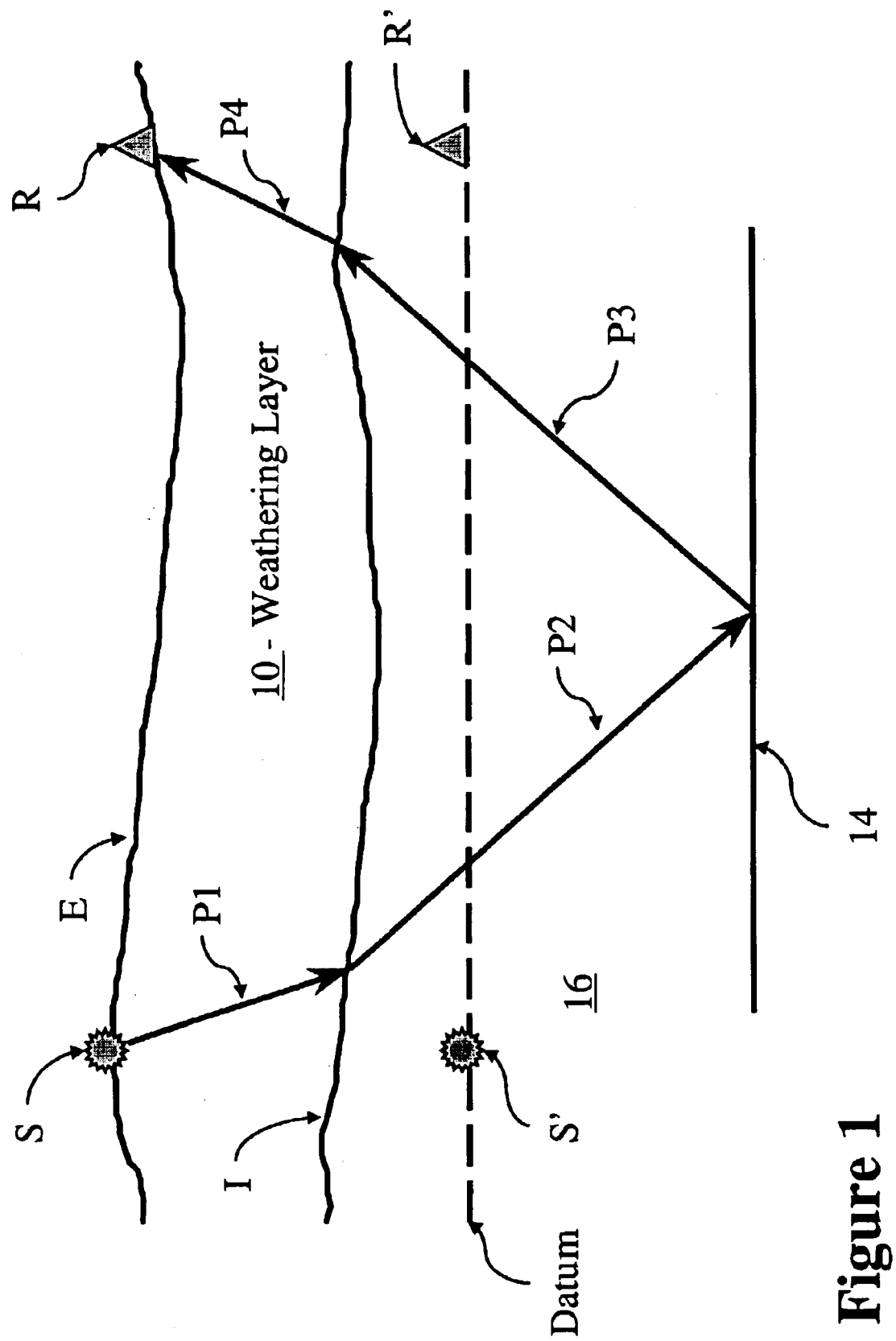
FIG. 1 is a schematic diagram of a seismic survey illustrating the presence of statics in the survey.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a statics solution algorithm that does not employ a model of the weathered layer and does not require user supplied velocity input information. In particular, this invention does not estimate the thickness of the weathered layer. This avoids the model related problems traditional methods often encounter, such as making invalid assumptions about a highly variable weathered layer or failing to derive an accurate model of the weathered layer because the model is not well constrained by the first arrival time information. The algorithm does not require the user to make accurate estimations of weathered layer attributes (such as thickness or velocity) about which little is known.

The method provides for obtaining first arrival information and, using a generalized Gauss-Seidel iteration scheme, decomposing each first arrival time into four independent terms: a source term, a receiver term, a term in horizontal distance from source to receiver (an offset term) and terms in elevation difference between source or receiver and the average elevation datum. Decomposing the first arrival time into four terms, including offset and elevation difference in addition to source and receiver terms, yields more accurate results than solving for source, receiver terms and offset terms only.

For each generalized Gauss-Seidel iteration, the elevation difference term is calculated as follows. 1) Apply the latest source, receiver and offset correction terms to a subset of the first arrival times to form residual times. 2) Find the difference between residual times for receivers at different elevations within the same shot profiles. 3) Derive a non-linear equation by performing a least squares fit of these residual time differences as a function of receiver elevation difference. 4) An average datum correction for each source is determined by the value of the least squares curve associated with the difference in elevation between the source and the average datum elevation. An average datum correction for each receiver is determined by the value for the least squares curve associated with the difference in elevation between the receiver and the average datum elevation.

For subsequent generalized Gauss-Seidel iterations, source and receiver average datum corrections calculated in the previous iteration are applied when calculating revised source, receiver and offset terms. Generalized Gauss-Seidel iterations are continued until changes in each term are acceptably small.

The source static correction is calculated for each source as the sum of the source term ("source id term"), the source average datum correction and a correction to shift from the average datum elevation to the desired final elevation. The values used for the source term and the source average datum correction term are those calculated in the last generalized Gauss-Seidel iteration.

The receiver static correction is calculated for each receiver as the sum of the receiver term ("receiver id term"), the receiver average datum correction and a correction to shift from the average datum elevation to the desired final elevation. The values used for the receiver term and the receiver average datum correction term are those calculated in the last Gauss-Seidel iteration.

Rather than building a near surface model, the model-free refraction statics solution method provided by this invention uses an iteration scheme to decompose first break times into four terms. Some of these terms can be used directly to calculate statics corrections. Although several different sets of terms might be used, the present method is successful when three conditions are met. Condition 1: The chosen set of terms must be complete. That is, decomposing the first break times into the chosen set of terms must result in a residual of negligible size. Condition 2: The chosen set of terms must include a term in offset. Condition 3: Each of the terms that belong to the chosen set, apart from the offset term, must be associated with either the source or the receiver.

First break times are decomposed into terms in source id, receiver id, offset, source elevation and receiver elevation (where source and receiver elevations are relative to an average elevation datum). For a given source-receiver pair, the first break time is broken into the predictable terms in offset, source elevation and receiver elevation, and the unpredictable terms in source id and receiver id.

Since the offset term can only be associated with horizontal propagation, the other terms must be independent of any horizontal propagation and are therefore associated with vertical propagation. We can associate the source id term with vertical propagation time from the average elevation datum at the source location to the refractor. The receiver id term is associated with the vertical propagation time from the refractor to the average elevation datum at the receiver location. The source and receiver elevation terms are associated with corrections from the average elevation datum to the source and receiver elevations. Consequently, the static correction for a source is the sum of the source id term and the source elevation term for that source. The static correction for a receiver is the sum of the receiver id term and the receiver elevation term for that receiver. These static corrections may also include a shift from the average elevation datum to a desired final elevation datum.

Figure 2:
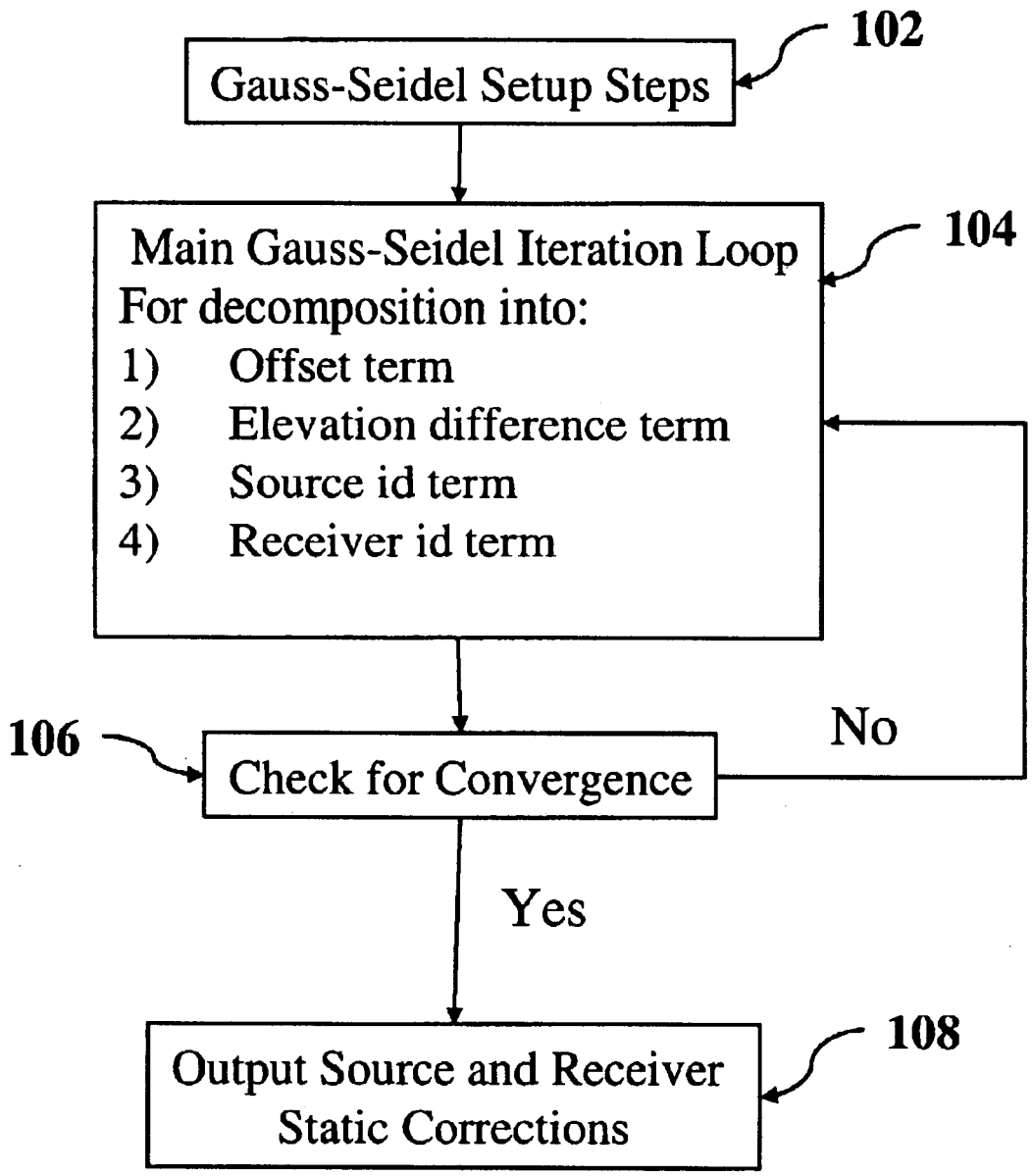
FIG. 2 illustrates a flow chart for a general overview of the present invention.

A general flowchart representing an embodiment of the invention is outlined in FIG. 2. The method begins with the Gauss-Seidel Setup 102, which is further illustrated in FIG. 3. The main Gauss-Seidel Iteration 104 is further illustrated in FIG. 4. After each iteration, the result is analyzed to check for convergence 106. The source and receiver statics calculations are determined as outlined above, as the sum of the source or receiver term with an elevation difference term, and any desired shift to a final datum 108.

Figure 3:
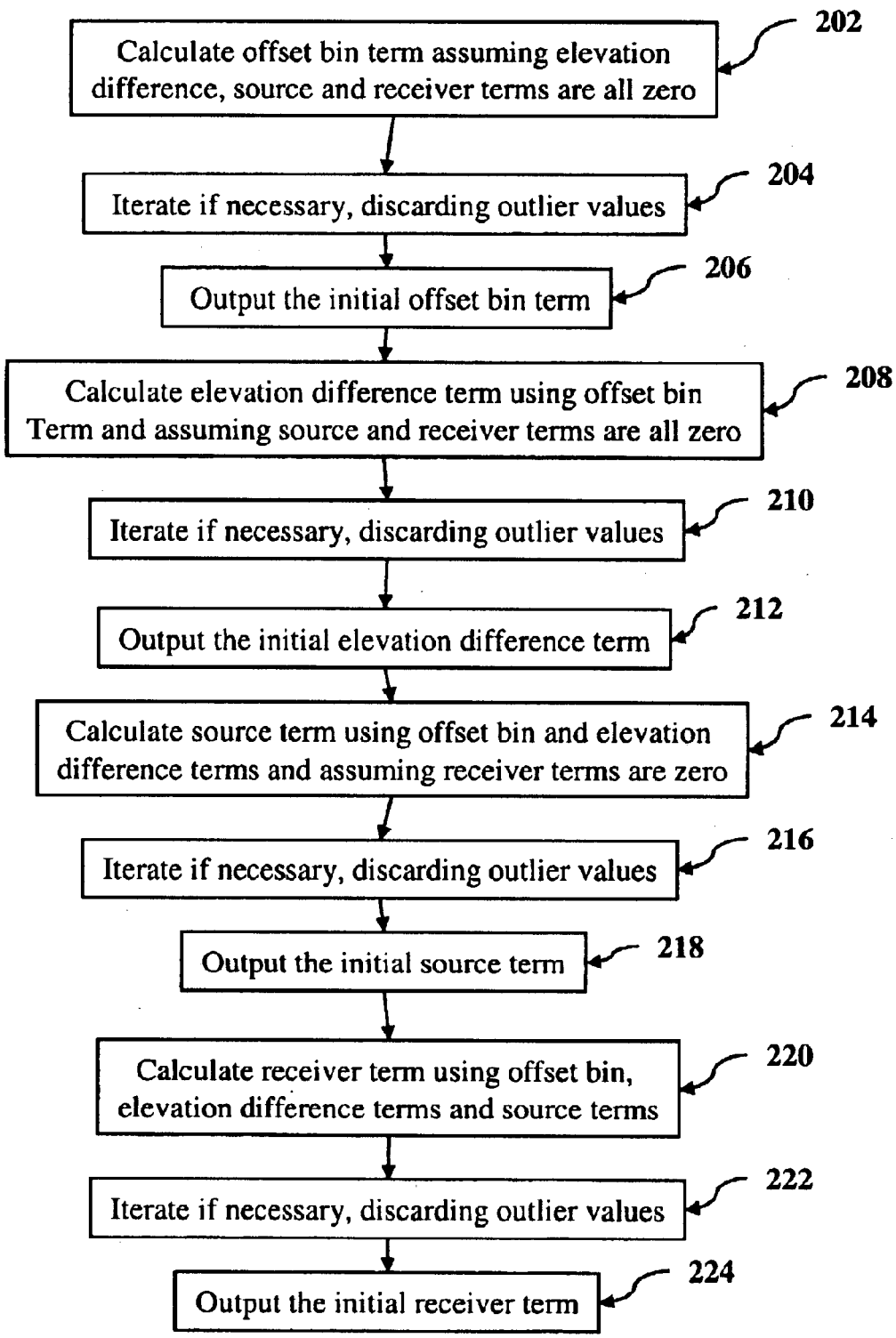
FIG. 3 illustrates a flow chart of the Gauss-Seidel setup.

FIG. 3 is a flow chart of the setup for the Gauss-Seidel iteration. The decomposition starts by assigning to each offset bin the average first break time 202 for the traces associated with that bin. Iterate, discarding outliers 204 (as being outside of some selected ranges as described with reference to FIG. 5) and recalculating the average residual first break time as before. The result is a correction term for each offset bin, the interpolated offset correction 206.

Calculate the source average datum correction terms and the receiver average datum correction terms 208 as described in the description for the Elevation Difference Term Calculation (see FIG. 6) below. At this point, no source id or receiver id terms are used since they have not yet been calculated in the Gauss-Seidel Setup. Iterate, discarding outliers 210 and recalculating the elevation difference term as before. The result is the initial elevation difference term 212.

For each source location, form the average residual first break time after applying the interpolated offset correction, the source average datum correction terms and the receiver average datum correction terms 214. Iterate, discarding outliers and recalculating the average residual first break time as before 216. This average residual first break time is the correction term 218 for each source (the source id term).

For each receiver location, form the average residual first break time after applying the interpolated offset correction, the source id correction (as computed in 218), the source average datum correction term and the receiver average datum correction terms 220. Iterate, discarding outliers and recalculating the average residual first break time as before 222. This average residual first break time 224 is the correction term for each receiver (the receiver id term).

Figure 4:
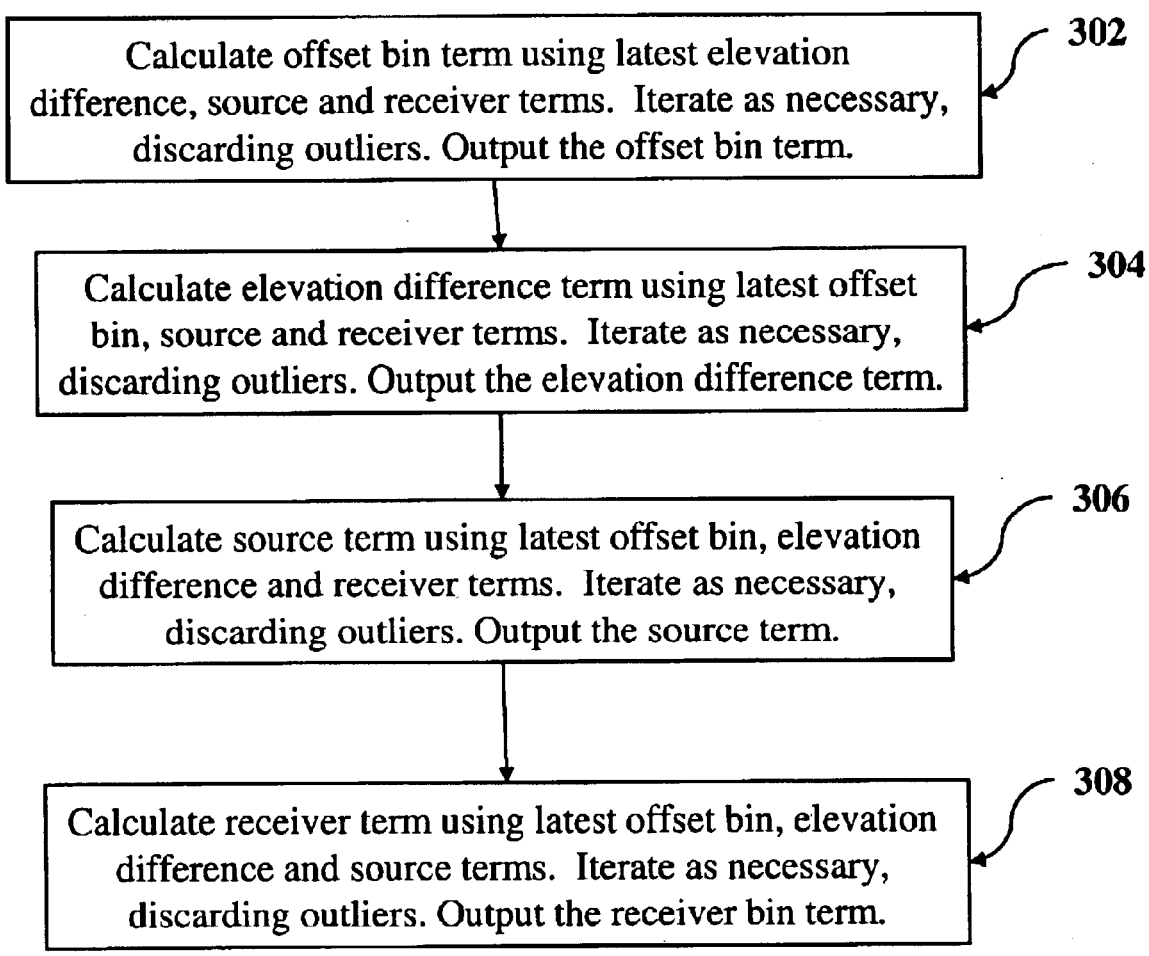
FIG. 4 illustrates a flow chart of the main Gauss-Seidel loop.

The main Gauss-Seidel Iteration Loop is illustrated in FIG. 4. The main Gauss-Seidel Iteration Loop begins with offset bin calculations 302. For each offset bin, form the average residual first break time after applying the latest source id term, receiver id term and source and receiver shifts to average datum (source average datum correction and receiver average datum correction). Iterate, discarding outliers (as explained in reference to FIG. 5) and recalculating the average residual first break time. This average residual first break time is the new offset correction term for each offset bin 302.

Calculate the new source average datum correction terms and/or the new receiver average datum correction terms 304 as described in the Elevation Difference Term Calculation (illustrated with reference to FIG. 6) section below. Iterate, discarding outliers and recalculating the elevation difference term. These average datum correction terms use the most current values for source id, receiver id and offset terms.

For each source, form the average residual first break time after applying the latest interpolated offset term, receiver id term and source and receiver shifts to average datum. Iterate, discarding outliers and recalculating the average residual first break time. This is the new term 306 for each source (source id term).

For each receiver, form the average residual first break time after applying the latest interpolated offset term, source id term and source and receiver shifts to average datum. Iterate, discarding outliers and recalculating the average residual first break time. This average residual first break time is the new term 308 for each receiver (receiver id term).

Figure 5:
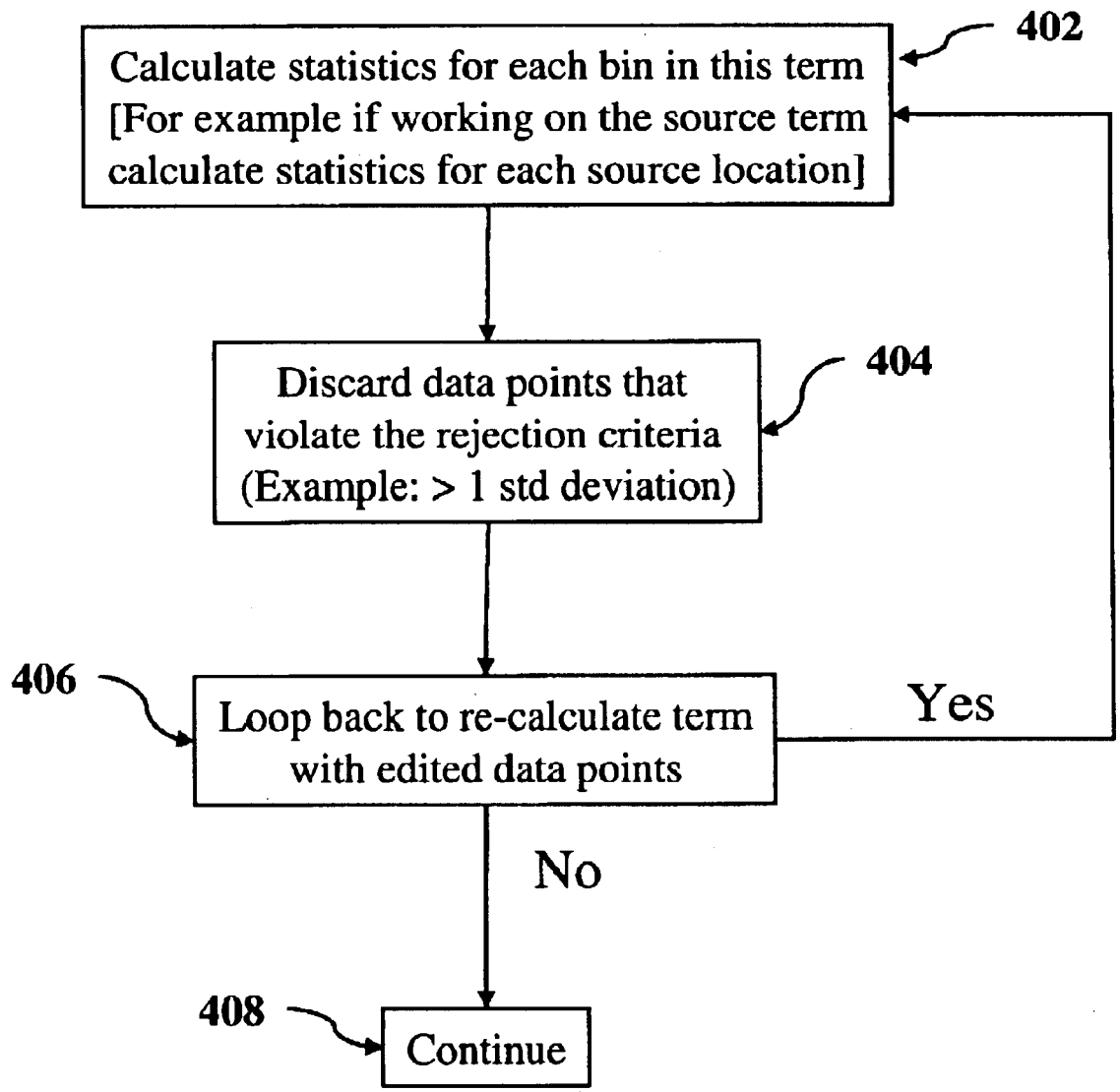
FIG. 5 illustrates a flow chart for discarding outliers.

Discarding Outliers is illustrated in FIG. 5. Each correction term recalculation step in each Gauss-Seidel iteration identifies and discards outliers as follows. 1) Calculate statistics 402 for trace residual first break times, for example the mean, standard deviation etc. 2) Ignore traces 404 with residual first break times greater in absolute value than the a predetermined threshold, for example, one standard deviation, or a selected percentage above or below the standard deviation. The threshold for the last outlier identification iteration in a preferred embodiment is one standard deviation. If more than one iteration is specified, the threshold can be two standard deviations for the first iteration, decreasing to one standard deviation for the last iteration. 3) Unless this is the last iteration, repeat the previous steps 406 as required, then continue 408.

Figure 6:
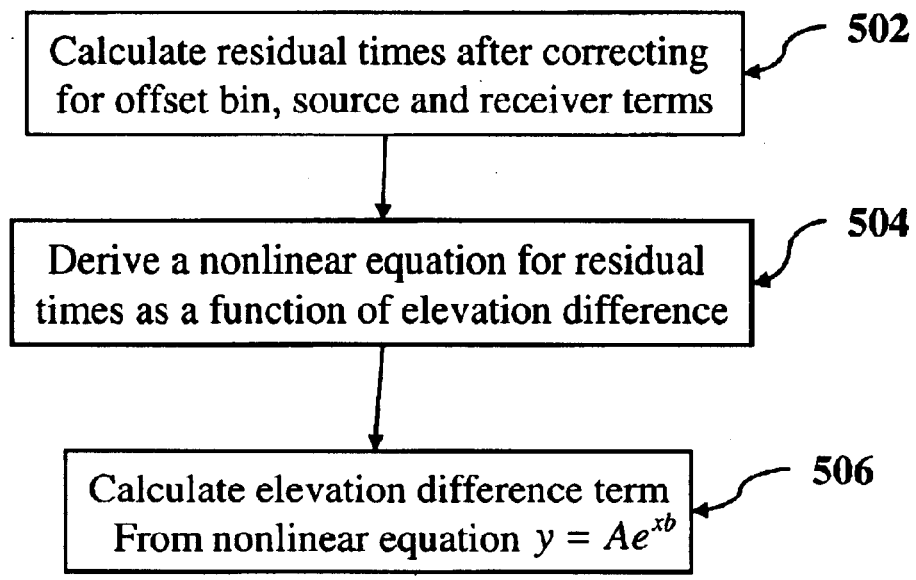
FIG. 6 illustrates a flow chart for determining elevation difference terms.

Determining the Elevation Difference Term is illustrated in FIG. 6. For each Gauss-Seidel iteration, a nonlinear function is derived relating residual time to the elevation difference between either source or receiver and the average elevation.

To Determine the Elevation Difference Term, apply the latest interpolated offset term, source term and receiver term to selected first break times to form residual times 501. Find the difference between residual times for receivers at different elevations within the same shot profiles 502. Derive a nonlinear equation by performing a least squares fit of these residual time differences as a function of receiver elevation difference 504. Use the nonlinear equation to calculate times for correcting sources to the average datum elevation (source average datum correction term) and for correcting receivers to the average datum elevation (receiver average datum correction term) 506.

The equation relating correction time with elevation difference must be nonlinear because times for very large elevation differences are smaller than would be predicted using linear extrapolation from times associated with small elevation differences. A nonlinear equation of the form $y=Ae^{xb}$ may be used, where y is the residual first break time after source id, receiver id and offset terms from the latest iteration have been removed. A is a scalar, x is the difference in the elevation from the average elevation and b is an exponent of the nonlinear best fit curve associated with the difference in elevation from the average.

Source and Receiver Statics can be calculated after any Gauss-Seidel iterations are completed. Source static corrections are calculated as the sum of the latest source term, source average datum correction term and a correction to shift from the average datum to the desired final datum. Receiver static corrections are calculated as the sum of the latest receiver term, receiver average datum correction term and a correction to shift from the average datum to the desired final datum.

Persons skilled in the art will understand that the statics correction method described herein may be practiced according the embodiments disclosed as well as equivalents that will be apparent to those skilled in the art. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method of determining source and receiver static corrections for seismic data, the method comprising:
   (a) determining source id terms, receiver id terms and offset terms from first break arrival times of seismic data;
   (b) applying said source id terms and receiver id terms and offset terms to the seismic data to obtain residual first break times;
   (c) determining average datum correction terms by forming a nonlinear equation for a least-squares fit of the residual first break times as a function of elevation difference;
   (d) determining at least one receiver static correction from said receiver id terms and receiver average datum correction terms; and (e) determining at least one source static correction from said source id terms and source average datum correction terms.

2. The method of claim 1 wherein the seismic data are within the same shot profile.

3. The method of claim 1 wherein determining source id terms, receiver id terms and offset terms from first break arrival times of seismic data further comprises Gauss-Seidel iterations.

4. The method of claim 1 wherein determining source id terms, receiver id terms and offset terms from first break arrival times of seismic data further comprises discarding outlier values.

5. The method of claim 4 further comprising determining thresholds of said outlier values as a percentage of a standard deviation of residual first break times.

6. The method of claim 1 wherein the nonlinear equation is of the form $y=Ae^{xb}$, where y is residual time, x is the elevation difference from the average elevation, A is a scalar and b is exponent of the nonlinear best fit curve associated with the difference in elevation.

7. The method of claim 1 wherein determining a least one receiver static correction further comprises determining a shift from an average datum to a desired final datum.

8. The method of claim 1 wherein determining a least one source static correction further comprises determining a shift from an average datum to a desired final datum.

9. A method of determining source and receiver static corrections for seismic data, the method comprising:

(a) obtaining first break arrival times for a set of seismic data;

(b) determine source id terms, receiver id terms, offset terms and elevation difference terms from said first break arrival times;

(c) determine residual first break times of said elevation difference terms for receivers at different elevations;

(d) determining source average datum correction terms and receiver average datum correction terms by forming a nonlinear equation for a least-squares fit of the residual first break times as a function of elevation difference; and (e) determining receiver static corrections from said receiver id terms and said receiver average datum correction terms.

10. The method of claim 9 wherein the seismic data are within the same shot profile.

11. The method of claim 9 wherein determining source id terms, receiver id terms, offset terms and elevation difference terms from first break arrival times of seismic data further comprises Gauss-Seidel iterations.

12. The method of claim 9 wherein determining source id terms, receiver id terms, offset terms and elevation difference terms from first break arrival times of seismic data further comprises discarding outlier values.

13. The method of claim 12 further comprising determining thresholds of said outlier values as a percentage of a standard deviation of residual first break times.

14. The method of claim 9 wherein the nonlinear equation is of the form $y=Ae^{xb}$, where y is residual time, x is the elevation difference from the average elevation, A is a scalar and b is exponent of the nonlinear best fit curve associated with the difference in elevation.

15. The method of claim 9 wherein determining at least one receiver static correction further comprises determining a shift from an average datum to a desired final datum.

16. The method of claim 9 wherein determining at least one source static correction further comprises determining a shift from an average datum to a desired final datum.

17. A method of determining source and receiver static corrections for seismic data, the method comprising:

(a) obtaining first break arrival times for a set of seismic data;

(b) determine source id terms, receiver id terms, offset terms and elevation difference terms for said first break arrival times;

(c) determine residual first break times of said elevation difference terms for receivers at different elevations;

(d) determining source average datum correction terms and receiver average datum correction terms by forming a nonlinear equation of the form $y=Ae^{xb}$ for a least-squares fit of the residual first break times as a function of elevation difference; and (e) determining receiver static corrections from said receiver id terms and said receiver average datum correction terms.

18. The method of claim 17 wherein the seismic data are within the same shot profile.

19. The method of claim 17 wherein determining source id terms, receiver id terms, offset terms and elevation difference terms from first break arrival times of seismic data further comprises Gauss-Seidel iterations.

20. The method of claim 17 wherein determining source id terms, receiver id terms, offset terms and elevation difference terms from first break arrival times of seismic data further comprises discarding outlier values.

21. The method of claim 17 wherein determining at least one receiver static correction further comprises determining a shift from an average datum to a desired final datum.

22. The method of claim 17 wherein determining at least one source static correction further comprises determining a shift from an average datum to a desired final datum.

* * * * *